United States Patent
Hugg

(10) Patent No.: US 6,626,621 B1
(45) Date of Patent: Sep. 30, 2003

(54) SELECTIVELY REMOVABLE TIE-DOWN STRAP WINCH ASSEMBLY FOR A TRAILER OR TRUCK

(76) Inventor: Richard C. Hugg, 3775 "O" Ave., Westside, IA (US) 51467

( * ) Notice: Subject to any disclaimer, the term of this patent is extended or adjusted under 35 U.S.C. 154(b) by 24 days.

(21) Appl. No.: 10/052,655

(22) Filed: Jan. 18, 2002

(51) Int. Cl.[7] .................................................. B60P 7/08
(52) U.S. Cl. ...................... 410/103; 410/100; 410/106; 410/110
(58) Field of Search .......................... 410/12, 97, 100, 410/103, 104, 106, 110; 248/499; 254/352, 329

(56) References Cited

U.S. PATENT DOCUMENTS

| | | | | |
|---|---|---|---|---|
| 4,367,993 A | * | 1/1983 | Meigs | 410/103 |
| 4,382,736 A | * | 5/1983 | Thomas | 410/104 |
| 4,715,754 A | | 12/1987 | Scully | 410/107 |
| 4,812,093 A | * | 3/1989 | Millar, Jr. | 410/110 |
| 5,388,938 A | * | 2/1995 | Helton | 410/101 |
| 5,490,749 A | | 2/1996 | Arbues | 410/103 |
| 5,664,918 A | | 9/1997 | Heider et al. | 410/103 |
| 5,836,060 A | | 11/1998 | Profit | |
| 5,860,777 A | * | 1/1999 | Walsh et al. | 410/100 |
| 5,961,263 A | * | 10/1999 | Nunez | 410/103 |
| 5,967,720 A | | 10/1999 | Profit | 410/116 |
| 6,059,499 A | * | 5/2000 | Bird | 410/103 |
| 6,102,637 A | * | 8/2000 | Mocci | 410/103 |
| 6,250,861 B1 | * | 6/2001 | Whitehead | 410/100 |
| 6,350,088 B1 | * | 2/2002 | Priester | 410/103 |
| 6,527,487 B2 | * | 3/2003 | Adams | 410/104 |

* cited by examiner

Primary Examiner—Stephen T. Gordon
(74) Attorney, Agent, or Firm—Thomte, Mazour & Niebergall; Dennis L. Thomte

(57) ABSTRACT

A generally Y-shaped winch assembly is described for use with a trailer or truck. The winch assembly includes a stem portion having a pair of horizontally spaced-apart plates extending upwardly from the upper end thereof. A strap receiver mechanism is rotatably mounted on the plates and is controlled by a conventional winch ratchet assembly. A spring-loaded hook member is mounted on the stem portion for engagement with the lower end of a side rail, the lower end of the side area of the trailer, or the lower end of a stand-off plate to maintain the winch assembly in a desired position at one side of the trailer.

10 Claims, 4 Drawing Sheets

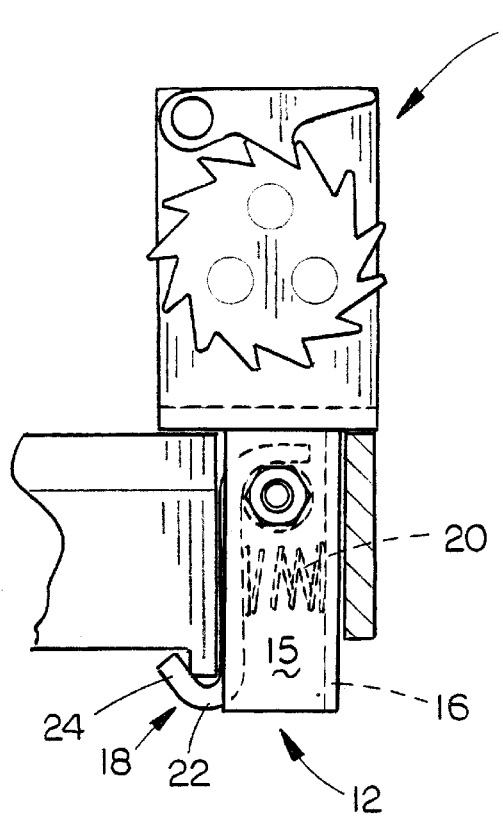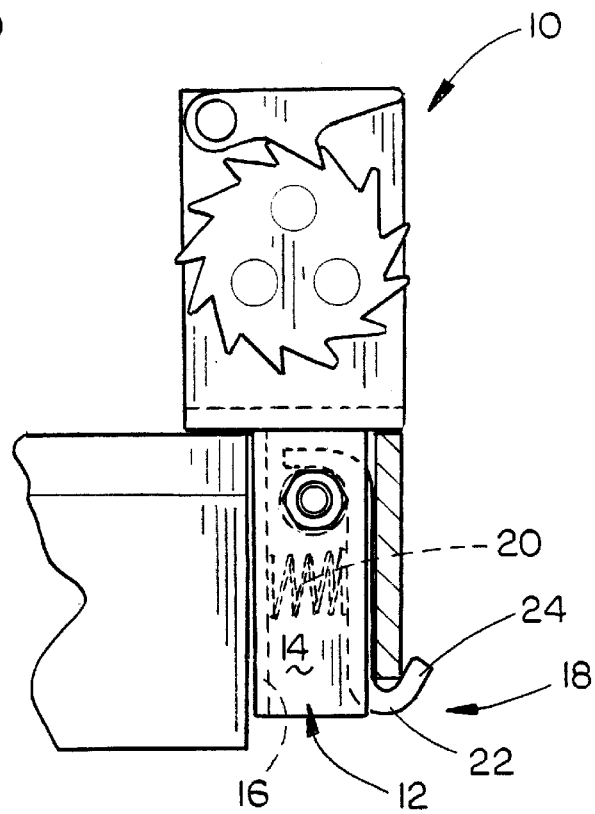
FIG. 4A  FIG. 4B
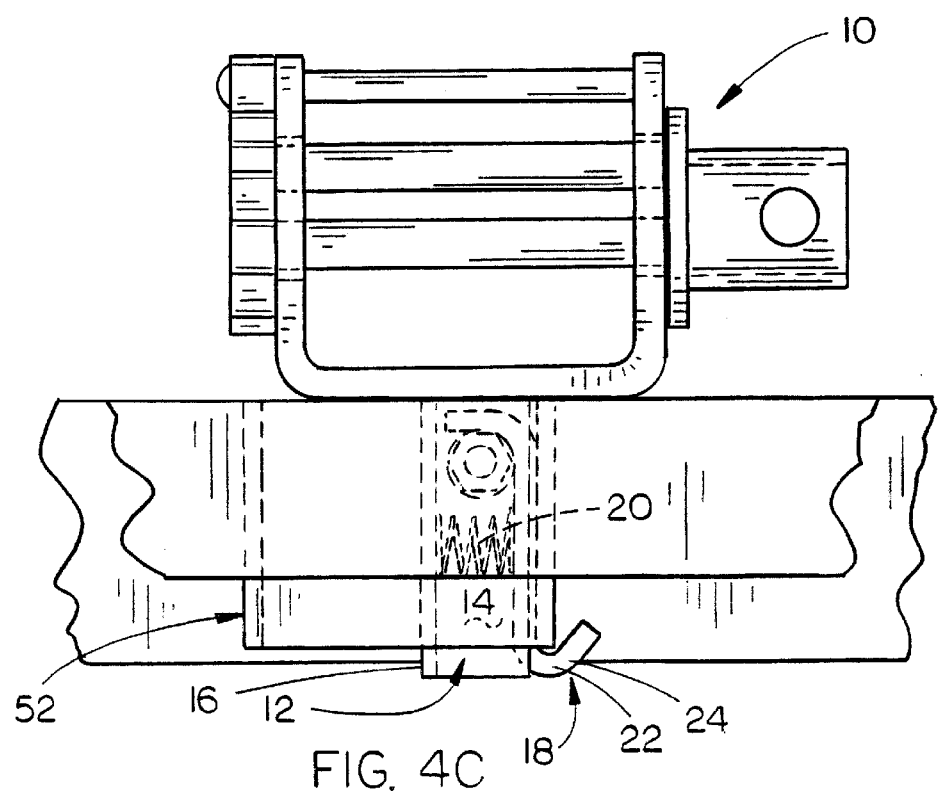
FIG. 4C

SELECTIVELY REMOVABLE TIE-DOWN STRAP WINCH ASSEMBLY FOR A TRAILER OR TRUCK

BACKGROUND OF THE INVENTION

1. Field of the Invention

This invention relates to a selectively removable tie-down strap winch assembly for a flatbed trailer and more particularly to a winch assembly which may be selectively positioned at any place along substantially the entire length of a flatbed trailer.

2. Description of the Related Art

Tie-down devices have been used for many years for tying down cargo resting on the bed of flatbed trailers, stepdeck trailers and straight trucks. As used herein, the word "vehicle" will include all types of trailers and trucks wherein cargo is secured to the beds thereof. Presently known tie-down devices include a plurality of winches which are each selectively longitudinally movable on a shaft positioned at one side of the trailer bed. One end of a strap is inserted into a winch and passes over the cargo with the other end of the strap being normally secured to the other side of the trailer. If the winch supporting shafts extended the entire length of the trailer, they would serve their purpose. However, in some types of trailers, it is not possible to run the winch supporting shaft the entire length of the trailer beds due to wheels, toolboxes positioned between wheels, etc. Therefore, in certain trailer configurations, it is impossible to use a tie-down strap winch for several feet along the length of the trailer. Additionally, in some cases, it is advantageous to have the winches positioned above the surface of the bed.

SUMMARY OF THE INVENTION

A generally Y-shaped winch assembly is described for use with a trailer having an elongated cargo supporting bed having two metal side rails running longitudinally along outer side areas of the bed and spaced laterally therefrom by stand-off plates to define pocket areas therebetween. The winch assembly includes a substantially vertically disposed stem portion having a pair of upstanding, horizontally spaced-apart plates mounted on the upper end thereof. A rotatable tie-down strap receiver is rotatably mounted on and extends between the plates and has a winch ratchet mechanism operatively connected thereto for winding one end of a tie-down strap therearound. The stem portion of the winch assembly has a spring-loaded hook member movably mounted thereon which is adapted to selectively and releasably engage the lower end of one of the side rails, the lower end of a stand-off plate extending between the side rail and the trailer, or the lower end of the side of the trailer to anchor the winch assembly with respect to the trailer bed.

It is therefore a principal object of the invention to provide a selectively removable tie-down strap winch assembly for a trailer or truck.

A further object of the invention is to provide an invention of the type described which may be removably positioned in pocket areas along substantially the entire length of the trailer bed.

Still another object of the invention is to provide a device of the type described wherein the device includes a spring-loaded hook member which may engage the lower end of a side rail, the lower end of a stand-off plate, or the lower end of the side of the trailer.

Yet another object of the invention is to provide a selectively removable tie-down strap winch assembly for a flatbed trailer which may be inserted between the side rail and the side of the trailer bed or into a stake pocket.

These and other objects will be apparent to those skilled in the art.

BRIEF DESCRIPTION OF THE DRAWINGS

FIG. 4A is a side elevational view illustrating the hook member of the invention having been rotated 180° from the position of FIG. 3;

FIG. 4B is a side elevational view of the embodiment of FIG. 3;

FIG. 4C is a front elevational view of a further embodiment of the invention and which shows the invention inserted into a stake pocket.

DESCRIPTION OF THE PREFERRED EMBODIMENT

Figure 1:
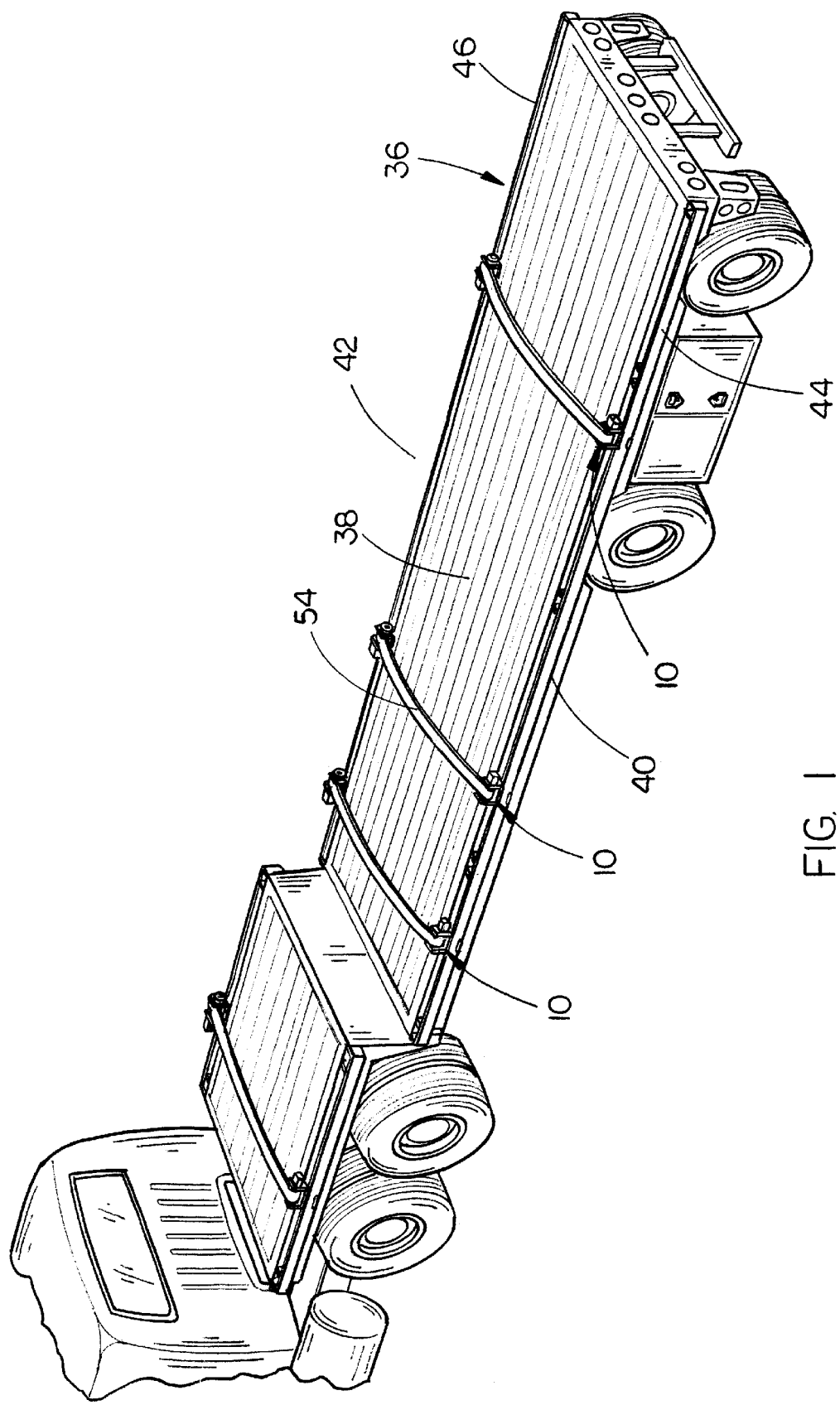
FIG. 1 is a rear perspective view of a trailer having a plurality of winch assemblies of this invention mounted thereon.
Figure 2:
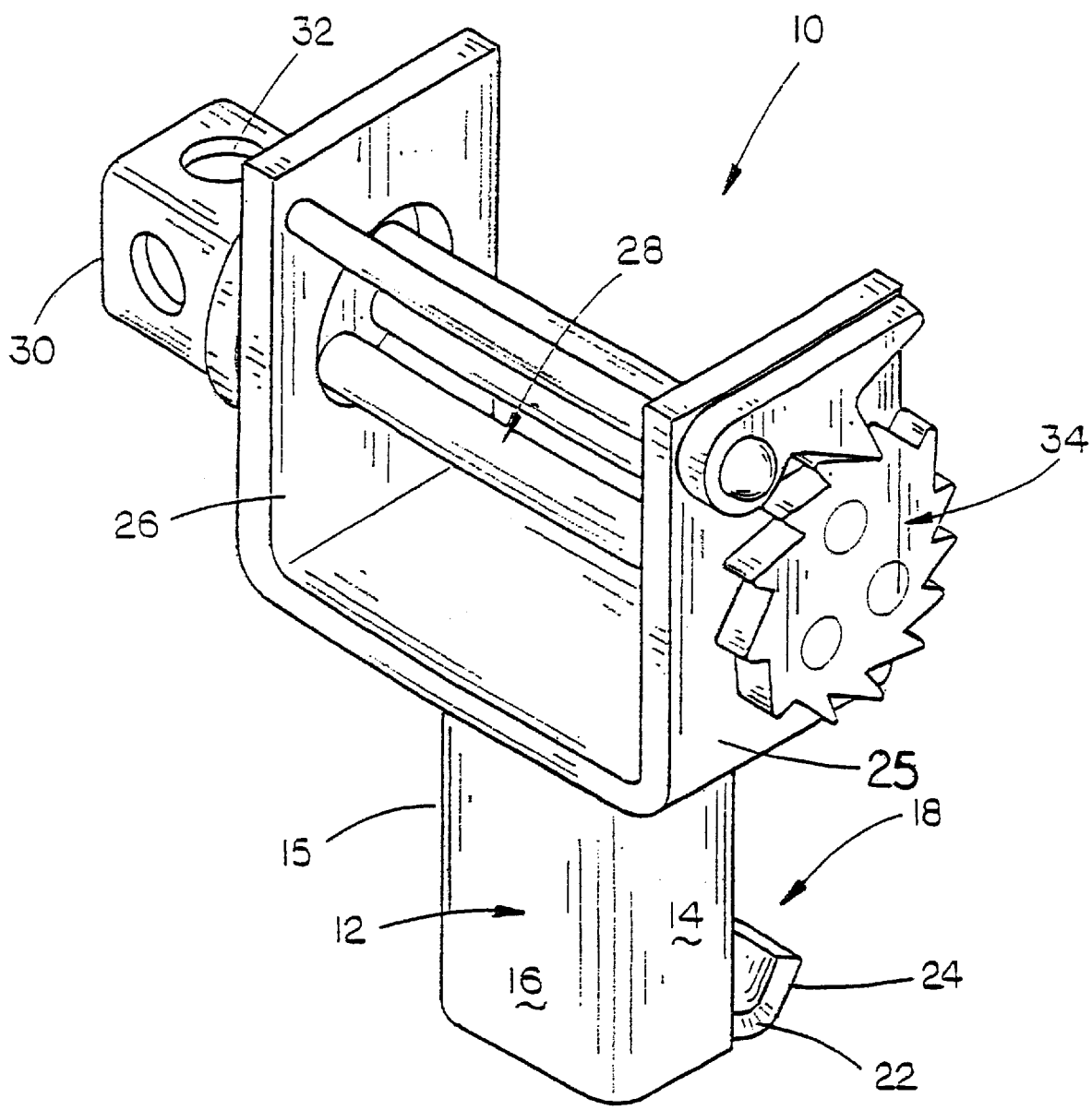
FIG. 2 is a perspective view of the winch assembly of this invention.
Figure 3:
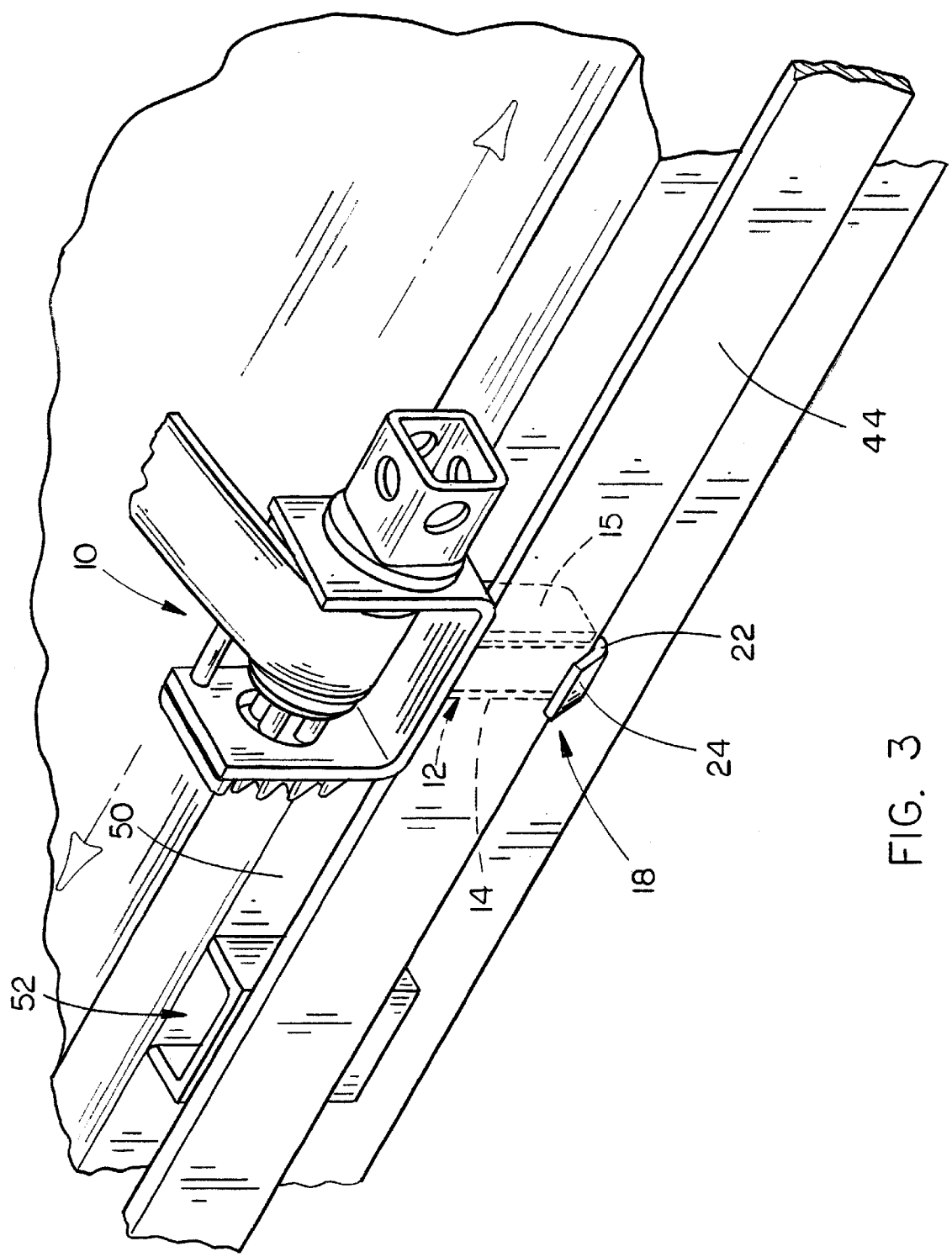
FIG. 3 is a perspective view of the winch assembly of this invention mounted between one side of the trailer and a side rail.

The numeral 10 refers generally to the generally Y-shaped winch assembly of this invention. Winch assembly 10 includes a stem or post portion 12 which is channel-shaped or C-shaped and which includes sides 14 and 15 and back wall 16. In one embodiment, the stem portion 12 is positioned so that the "opening" of the stem portion 12 faces laterally outwardly, as seen in FIGS. 2, 3 and 4B. A hook member 18 is pivotally mounted between the sides 14 and 15 and is movable between latched and unlatched positions, as seen in the drawings. A spring 20 urges hook member 18 to its latched position. Hook member 18 could also be urged to the latched position by a counterweight assembly. The lower end of the hook member 18 includes a hook portion 22 having an upwardly and outwardly extending portion 24.

A pair of upstanding and horizontally spaced-apart plates 25 and 26 are secured to the upper end of stem portion 12 and have a strap receiver or drum mechanism 28 rotatably mounted therein and extending therebetween. A tubular member 30 is secured to one end of the strap receiver mechanism 28 and includes registering openings 32 formed therein adapted to receive one end of a pry bar or the like therein. The other end of the strap receiver mechanism 28 is provided with a conventional winch ratchet assembly 34.

The winch assembly 10 of this invention is designed to be used with a stepdeck or flatbed trailer of the type such as illustrated in the drawings and generally referred to by the reference numeral 36. The winch assembly 10 could also be used to secure cargo on the bed of a straight truck. Trailer 36 includes a bed portion 38 having opposite sides or side areas 40 and 42 having upper and lower ends. Side rails 44 and 46 are positioned outwardly of the side areas 40 and 42, respectively, by conventional stand-offs which define pocket areas 50 between the side areas 40 and 42 and the side rails 44 and 46. Some trailers are also provided with stake pockets 52.

When it is desired to utilize a tie-down strap to secure cargo on the bed of the trailer, the winch assembly 10 is properly positioned with respect to the cargo and the stem portion 12 is inserted downwardly into one of the pocket areas 50 so that the hook portion 22 faces outwardly (FIG. 3). As the stem portion 12 is being inserted downwardly into the pocket area 50, the portion 24 of hook member 18 engages the respective side rail (44) to move the hook member 18 from its normally latched position to its unlatched position. Once the hook portion 22 is below the lower end of the side rail, the hook member 18 moves outwardly, due to the spring 20 acting upon hook member 18, to engage the lower end of the side rail to anchor the winch assembly 10 in position with respect thereto (FIG. 3).

One end of a tie-down strap 54 is secured to side area 42 of trailer 36 in conventional fashion. The strap 54 is extended over the cargo to be tied down and the other end of the strap 54 is inserted into strap receiver mechanism 28 between the rods 56 thereof. The tubular member 30 is then rotated through the use of a pry bar or the like to cause the strap 54 to be wound upon the strap receiver mechanism 28 until the cargo is securely tied down with the winch ratchet assembly 34 preventing unwinding rotational movement of the strap receiver mechanism 28 in conventional fashion.

In some trailer configurations, it may be desirable to secure the hook portion 22 of hook member 18 to the lower end of the side area of the trailer, as seen in FIG. 4A. In that case, the stem portion 12 would probably have to be lengthened and the channel-shaped stem portion 12 would be rotated 180° with respect to the plates 25 and 26. Further, the hook member 18 could be rotated 90° from the position illustrated in FIG. 4 to the position of FIG. 4C so that the hook portion 22 of hook member 18 engages the lower end of one of the plates of the stake pockets 52.

Thus it can be seen that a novel winch assembly has been provided for use on a flatbed trailer which can be mounted on the trailer at any place along the length of the trailer. The winch assembly is easily secured to the trailer and easily removed therefrom.

Thus it can be seen that the invention accomplishes at least all of its stated objectives.

I claim:

1. In combination with a vehicle having an elongated cargo supporting bed having two metal side rails, having upper and lower ends, running longitudinally along outer side areas of the bed and spaced laterally therefrom to define pocket areas therebetween, comprising:

a generally Y-shaped winch assembly including a substantially vertically disposed stem portion, having upper and lower ends; a pair of upstanding, horizontally spaced-apart plates mounted on the upper end of said stem portion; a tie-down strap receiver rotatably mounted on and extending between said plates; and a winch ratchet mechanism operatively connected to said tie-down strap receiver for winding one end of a tie-down strap therearound;

said stem portion having a hook member movably mounted thereon which is adapted to selectively releasably engage the lower end of one of said side rails, when said stem portion of said winch assembly is inserted downwardly into one of said pocket areas, to anchor said winch assembly.

2. The combination of claim 1 wherein said hook member is movable between latched and unlatched positions and wherein a spring urges said hook member towards its latched position.

3. The combination of claim 1 wherein said hook member is movable between latched and unlatched positions and further including means for urging said hook member towards its latched position.

4. The combination of claim 2 wherein said hook member is mechanically moved from its said latched position to its said unlatched position when said stem portion is inserted downwardly into one of said pocket areas.

5. In combination with a vehicle having an elongated cargo supporting bed having two metal side rails, having upper and lower ends, running longitudinally along outer side areas of the bed and spaced laterally therefrom to define pocket areas therebetween which are defined by upstanding stand-off plates, having upper and lower ends, extending outwardly from the side areas of the bed to the associated side rails, comprising:

a generally Y-shaped winch assembly including a substantially vertically disposed stem portion, having upper and lower ends; a pair of upstanding, horizontally spaced-apart plates mounted on the upper end of said stem portion; a tie-down strap receiver rotatably mounted on and extending between said plates; and a winch ratchet mechanism operatively connected to said tie-down strap receiver for winding one end of a tie-down strap therearound;

said stem portion having a hook member movably mounted thereon which is adapted to selectively releasably engage the lower end of said stand-off plates, when said stem portion of said winch assembly is inserted downwardly into one of said pocket areas, to anchor said winch assembly.

6. In combination with a vehicle having an elongated cargo supporting bed having two metal side rails, having upper and lower ends, running longitudinally along outer side areas, having upper and lower ends, of the bed and spaced laterally therefrom to define pocket areas therebetween, comprising:

a generally Y-shaped winch assembly including a substantially vertically disposed stem portion, having upper and lower ends; a pair of upstanding, horizontally spaced-apart plates mounted on the upper end of said stem portion; a tie-down strap receiver rotatably mounted on and extending between said plates; and a winch ratchet mechanism operatively connected to said tie-down strap receiver for winding one end of a tie-down strap therearound;

said stem portion having a hook member movably mounted thereon which is adapted to selectively releasably engage the lower end of one of said side areas when said stem portion of said winch assembly is inserted downwardly into one of said pocket areas, to anchor said winch assembly.

7. In combination with a vehicle having an elongated cargo supporting bed, comprising:

a generally Y-shaped winch assembly including a substantially vertically disposed stem portion, having upper and lower ends; a pair of upstanding, horizontally spaced-apart plates mounted on the upper end of said stem portion; a tie-down strap receiver rotatably mounted on and extending between said plates; and a winch ratchet mechanism operatively connected to said tie-down strap receiver for winding one end of a tie-down strap therearound;

said stem portion having a hook member movably mounted thereon which is adapted to selectively releasably engage a lower edge portion of the bed, when said stem portion of said winch assembly is inserted downwardly into an opening formed in the bed.

8. The combination of claim 7 wherein said hook member is movable between latched and unlatched positions and wherein a spring urges said hook member towards its latched position.

9. The combination of claim 8 wherein said hook member is mechanically moved from its said latched position to its said unlatched position when said stem portion is inserted downwardly into the opening formed in the bed.

10. In combination with a vehicle having an elongated cargo supporting bed having opposite sides, each of said opposite sides having stake pockets provided thereon which have upper and lower ends, comprising:

a generally Y-shaped winch assembly including a substantially vertically disposed stem portion, having upper and lower ends; a pair of upstanding, horizontally spaced-apart plates mounted on the upper end of said stem portion; a tie-down strap receiver rotatably mounted on and extending between said plates; and a winch ratchet mechanism operatively connected to said tie-down strap receiver for winding one end of a tie-down strap therearound;

said stem portion having at least one hook member movably mounted thereon which is adapted to selectively releasably engage the lower end of one of said stake pockets, when said stem portion of said winch assembly is inserted downwardly into one of said stake pockets, to anchor said winch assembly.

\* \* \* \* \*